No. 607,481. Patented July 19, 1898.
F. H. RICHARDS.
AUTOMATIC WEIGHING MACHINE.
(Application filed Nov. 8, 1897.)

(No Model.) 5 Sheets—Sheet 1.

*Fig. 1.*

Witnesses: Inventor:
P. G. Hewitt F. H. Richards
Fred J. Dole

Fig. 2.

No. 607,481. Patented July 19, 1898.
F. H. RICHARDS.
AUTOMATIC WEIGHING MACHINE.
(Application filed Nov. 8, 1897.)
(No Model.) 5 Sheets—Sheet 3.

Witnesses:
Inventor:

No. 607,481. Patented July 19, 1898.
F. H. RICHARDS.
AUTOMATIC WEIGHING MACHINE.
(Application filed Nov. 8, 1897.)

(No Model.) 5 Sheets—Sheet 4.

Fig. 4.

Witnesses:
P. G. Hewitt
Fred. J. Dole.

Inventor:
F. H. Richards.

No. 607,481. Patented July 19, 1898.
F. H. RICHARDS.
AUTOMATIC WEIGHING MACHINE.
(Application filed Nov. 8, 1897.)
(No Model.) 5 Sheets—Sheet 5.

Fig. 5.

Witnesses.
P. G. Hewitt
Fred. J. Dole.

Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,481, dated July 19, 1898.

Application filed November 8, 1897. Serial No. 657,745. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines, the object being to provide an improved machine of this character for automatically weighing and delivering various kinds of materials.

The invention includes as to one of its features a load-receiver, a stream-controller, a plurality of beams supported upon the framework and having, preferably, different degrees or ratios of movement, one of said beams constituting an actuator for the stream-controller, and means for intercepting the return of the actuating-beam with the other beam, by reason of which the several parts of the weighing mechanism, excluding, of course, the actuating-beam, can return promptly to their primary positions on the discharge of a load, said actuating-beam when released serving to operate the stream-controller to permit the supply of material to enter the load-receiver.

Another object of the invention is to provide beam mechanism involving a plurality of beams having different efficiencies, so that one may be shifted by the other. This advantage I may secure by making the counterweight of one of the beams lighter than the other, by virtue of which the beam having the lighter counterweight can be shifted relatively to and by its companion, and in the present case said beam having the lighter counterweight acts as the valve-actuator, as it has a longer or multiplied stroke relatively to the other, whereby the proper operation of the stream-controller as said beam resumes its initial position is assured.

Another feature of the invention resides in mounting a latch-tripper upon one of the beams and connecting it with the other beam. This latch-tripper I prefer to mount upon that beam having the less degree of movement and to hold it against action by a detent of suitable construction, and said detent may be operated to release the latch-tripper at the proper time by means of suitable construction, such as by a device controlled by the supply apparatus.

In the drawings accompanying and forming a part of this specification.

Similar characters designate like parts in all the figures of drawings.

The framework upon which the several parts of the machine are mounted consists in the present case of the chambered base or bed 2, the side frames 3 and 4, mounted thereon, and the brackets 5 and 6, extending oppositely from the supply-hopper H, the brackets resting on and being secured to the side frames.

The weighing mechanism is represented consisting of a load-receiver, as G, and a plurality of supporting scale-beams, as B and B', for the load-receiver, each of the beams consisting of a pair of arms, as 6 and 7, respectively joined at their opposite ends by the counterweights W and W', respectively, said weights balancing the load-receiver.

The beam-arms 6 of the scale-beam B and the coöperating arms 7 of the scale-beam B' are pivotally mounted for oscillation, as at $x$ and $x'$, respectively, at opposite sides of the base 2, and the load-receiver G is sustained upon said beam-arms between the points $x$ and $x'$ in a manner shown, for example, in prior patent, No. 548,840, granted to me October 29, 1895, to which reference may be had.

The beam-counterweight W is heavier than the beam-counterweight W', for a purpose that will hereinafter appear, and a convenient construction of said beams is illustrated in the drawings, the weight W being solid, while the weight W' is hollow or chambered.

The discharge of the loads from the receiver G is controlled by a closer, as L, consisting of a plate connected with the said load-receiver for oscillation, and being adapted when shut to cover the usual discharge-outlet. The closer is hinged to the load-receiver preferably by a joint constructed as follows: The closer has on its rear side the hook 20, loosely fitting in a groove or pocket 21 on the lower side of the load-receiver, as indicated clearly in the several side elevations.

The load-discharge-controlling means includes a latch, such as L', pivoted, as at 22, upon the load-receiver, and the forward weighted arm 23 of said latch being adapted to engage a device operative with the closer, as the arm 24, fixed to and extending from the gravitative closer-actuator or closer-shutting weight 25, secured to the closer-retarding regulator R, which consists of a curved plate pivoted, as at 26, to the lower side of the load-receiver opposite to the closer-joint.

The regulator R has a crank-arm 37, to the upper end of which the link 28 is pivoted, said link being likewise jointed to the closer L between its discharge edge and the center of oscillation, and the several pivotal points of the crank-arm and link are so disposed, when the closer is shut, as to be near a common line, so as to remove as far as possible the pressure applied to the latch L', which engages the upper or free end of the arm 24.

It will be apparent that when the latch L' engages the arm 24 the closer L, through the intervening connections, will be held shut. When the latch is tripped, the closer is released, and the weight of the load in the receiver G is sufficient to force the same open, as indicated in Fig. 5.

The regulator R extends under the discharge edge of the closer and has a depression or pocket 28' to receive any leakage from the closer during the making up of the load, so that no material can be wasted.

Figure 5:
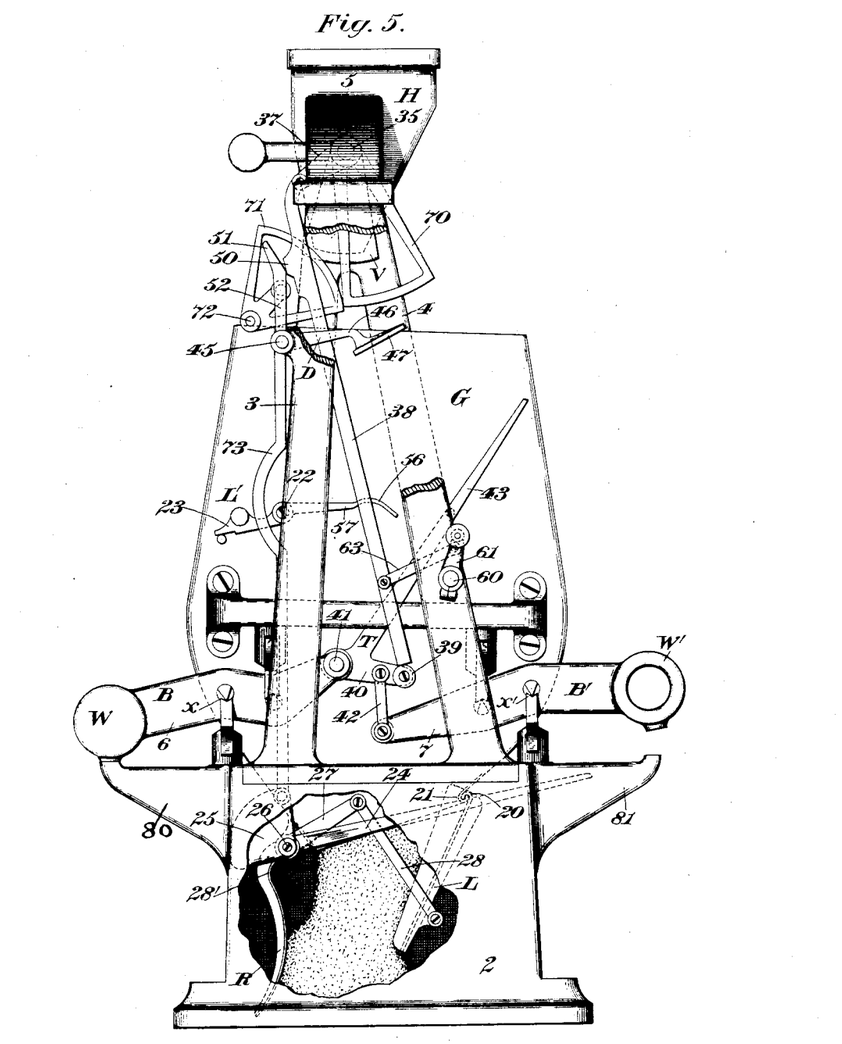

On the opening of the closer in the manner just set forth the regulator is swung outward into the path of the discharging stream, as indicated in Fig. 5, and the mass acting against said regulator will retard its return movement by the weight 25. When the material has passed entirely below the lower edge of the regulator R, the latter can be returned to its primary position by the weight 25. The crank-arm 27 and link 28 are so organized that when the regulator is returned to its initial position an accelerated movement is imparted to the closer, whereby it is shut without delay.

The hopper H serves as a convenient means for delivering a stream of material to the load-receiver to form the load, although some other device may be employed for the purpose.

The flow of material from the hopper H is regulated by a valve, as V, fixed to the two-part shaft S, the respective sections 35 and 36 of which are carried by suitable bearings on the brackets 5 and 6, respectively. The valve V is of the "pan" type, it being swung under the outlet of the hopper H by gravity or its own weight to cut off the supply of material to the load-receiver, the closure of the valve being controlled, as is customary, from the weighing mechanism.

The shaft-section 35 is provided with the crank-arm 37, to which the controlling-rod 38 is pivoted, said rod being acted upon by the weighing mechanism to limit the closing of the valve on the downstroke of the load-receiver and in the opposite direction to swing said valve open to permit the supply to enter the receiver.

The lower end of the rod 38 is in contact with the projection 39 upon the branch 40 of the latch-tripper T, consisting of a V-shaped lever pivoted at its angle, as at 41, upon one of the arms 6 of the beam B, said branch 40 of the tripper being connected between its ends by the link 42 with an arm 7 of the beam B'.

The upright or long arm 43 of the tripper, which carries a device for actuating the latch L' to effect the release of the closer L, is normally engaged by a detent D of suitable construction, which holds said arm against lateral movement, but permits it to descend longitudinally on the descent of the load-receiver.

The detent for engaging the latch-tripper T is in the form of an angle-lever pivoted at its angle, as at 45, upon the side frame 3, the arm 46 of said detent having a stop or offset 47, adapted to bear against the end of the arm 43 of the latch-tripper.

Figure 1:
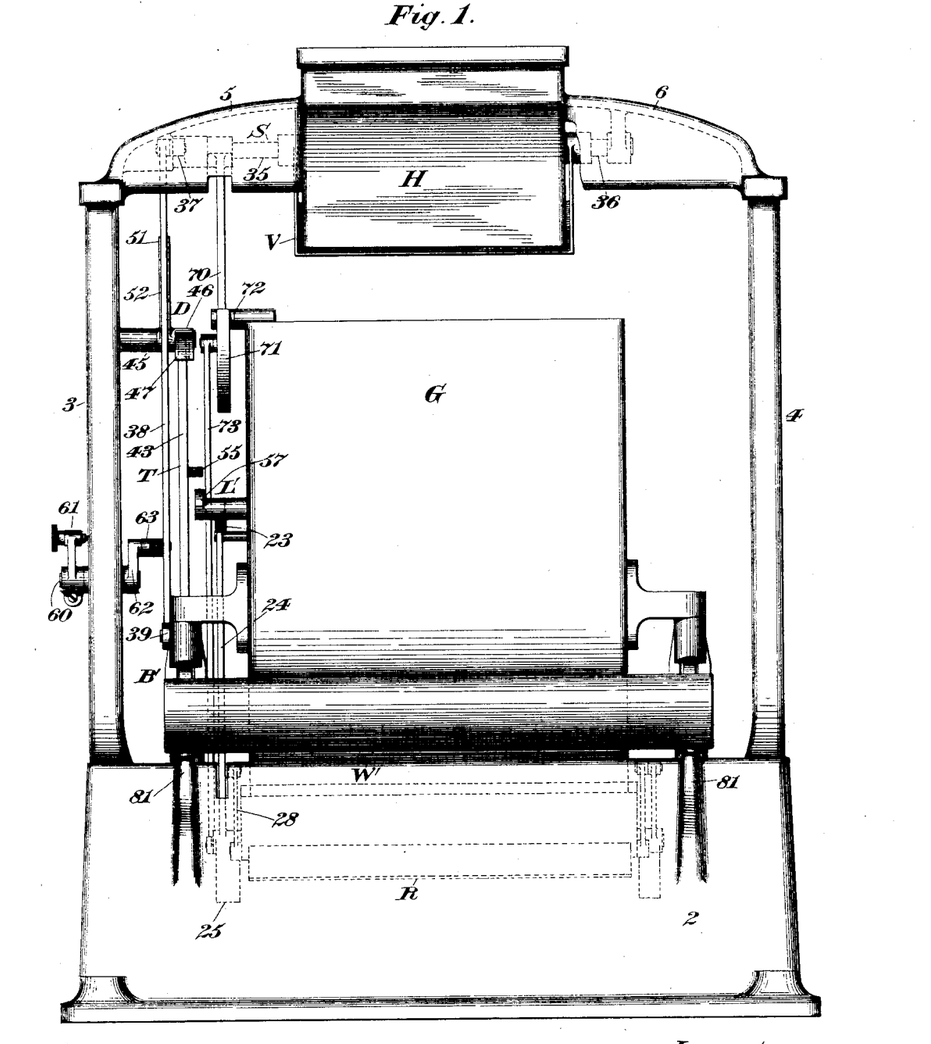
Figure 1 is a front elevation of a weighing-machine including my present improvements.
Figure 2:
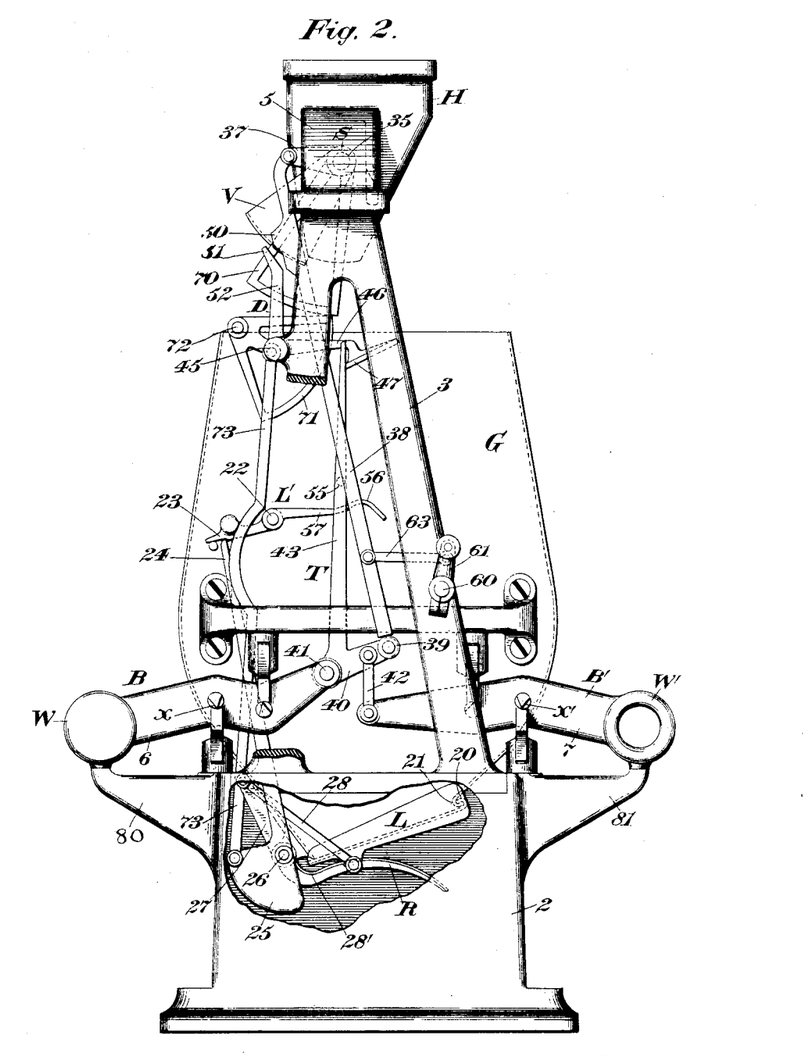
Figs. 2, 3, 4, and 5 are side elevations of the machine as seen from the left in Fig. 1, showing the positions occupied by the different parts during the making and discharging of a load.

When the valve is wide open, as shown in Fig. 2, the full volume of the supply will enter the load-receiver, and when a certain proportion of the load has been received the load-receiver, and consequently the poising portions of the two beams, will descend, which results in simultaneously pulling the tripper straight downward, the lateral movement of said tripper being prevented, as is evident, by the stop or shoulder 47 of the detent D. When the parts thus descend, the projection 39 will fall away from the rod 38, permitting the valve V to close by gravity, this operation being concluded on the completion of a load.

The device for actuating the detent D to effect the release of the latch-tripper T is operative with the supply or valve mechanism, it consisting of a projection or offset 50, situated near the upper end of the rod 38 and adapted to engage the angular extension 51 on the arm 52 of said detent when the load is nearly completed, thereby to raise the working arm 46 of the detent to disengage the same from the arm 43 of the latch-tripper, by reason of which on the further and slight movement of the beam mechanism the tripper will be given an accelerated side thrust to raise the weighted arm 23 of the closer-holding latch L'.

The working arm 43 of the latch-tripper is equipped with a projection or pin 55, adapted to impinge against the curved face 56 near the free end of the latch-arm 57.

Figure 3:
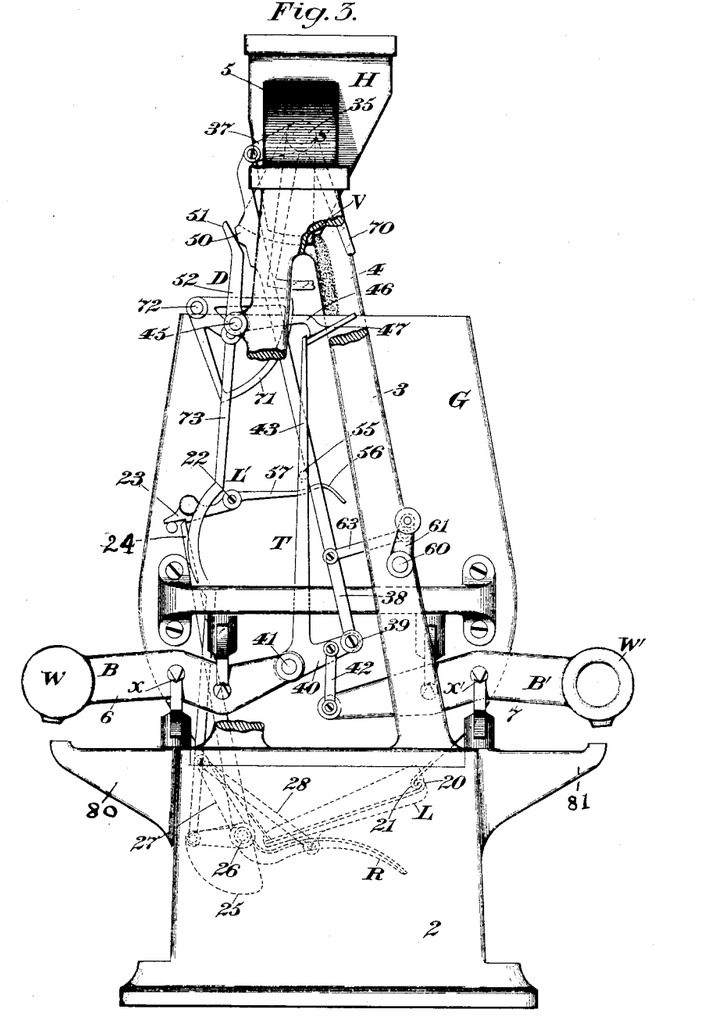
Figure 4:
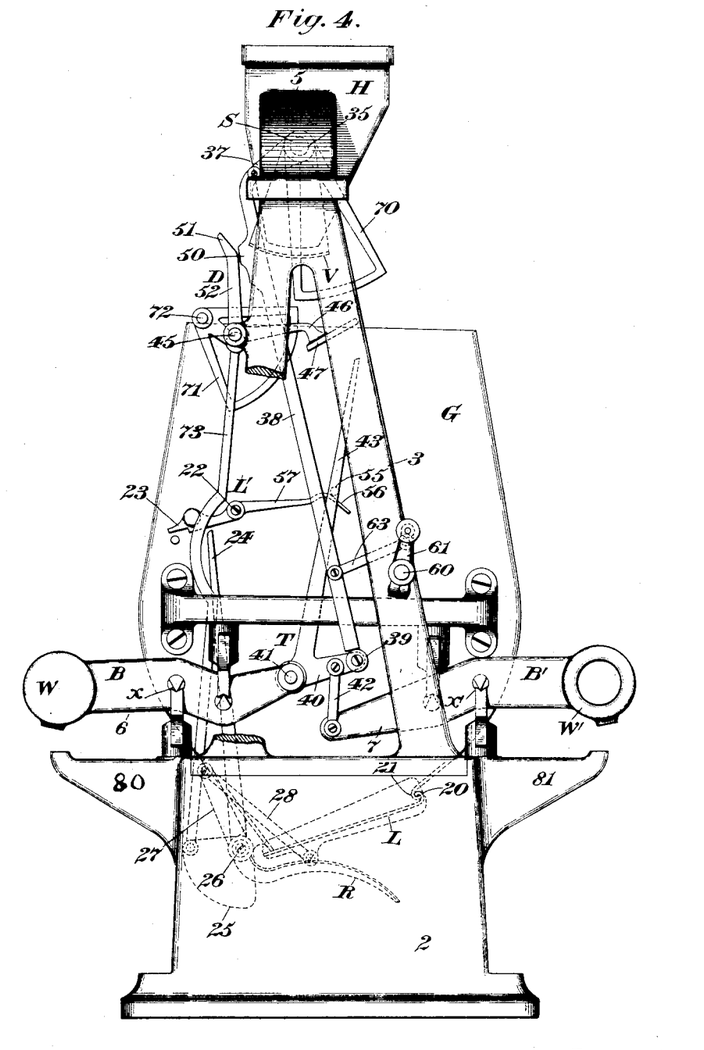

In Fig. 3 the load is supposed to be nearly completed. When the valve has advanced a slight distance beyond the point in which it is shown in Fig. 3, the detent-arm 46 will be elevated by the actuator 50 on the rod 38, so as to release the tripper T, and as the poising sides of the two beams descend the link 42 will be drawn downward, thereby shifting the tripper about its center to move the arm 43 laterally and carry the projection or pin 55 into contact with the curved face 56 on the latch-arm 57. When this takes place, the weighted arm 23 of the latch is raised above the crank-arm 24 to release the closer L.

The stop or offset 47 of the detent D is weighted, so as to return the same to its primary position, and its under face is oblique or angular, whereby when the tripper-arm 43 has nearly reached its normal position it can engage said angular face and lift the detent-arm 46, and when these parts have passed out of contact the detent-arm will drop behind and hold the tripper-arm against retraction.

The machine is equipped with the usual testing means now to be briefly described. The side frame 3 carries a short rock-shaft 60, furnished at its opposite ends with the cranks 61 and 62, the crank-arm 62 being connected by the link 63 with the thrust-rod 32. The crank-arm 61 when manipulated acts to swing the rod 38 out of contact with the projection 39 to make a test in a manner well known in this art.

In connection with the supply and discharge mechanisms I provide reciprocally-effective interlocking stops in position and adapted alternately to block the action of each other and preferably connected with the closer L and with the supply-valve V, by reason of which the opening of the closer is prevented during the supply period, as is also the passage of material into the load-receiver while the load is being discharged. These coöperating stops are designated by 70 and 71, and they are shown consisting of skeleton segments, the part 70 being fixed directly to the shaft-section 35. The stop 71 is pivoted, as at 72, upon the load-receiver, the rod 73 being pivoted to said stop 71 eccentrically to the latter. The lower end of the rod is jointed to the closer-actuating weight 25. The action of said stops is clearly shown in the several side elevations.

In Fig. 2 the closer L is represented shut and the valve V as wide open, at which time the stop 71 is in contact with the under curved working face of the coöperating stop 70, so that should the latch L be prematurely tripped or fail to operate from any cause the oscillation of the stop 71 would be blocked by the coöperating stop 70, disposed in its path of oscillation, and this relation will continue until the valve V is shut, at which time the stop 70 will have been carried across the path of oscillation of the coöperating stop 71, and when the latch is tripped the closer will be opened and will act, through the intermediate connections, to elevate the rod 73 and consequently the stop 71, whereby the latter is carried behind and into contact with the coöperating stop 70, as indicated in Fig. 5, thereby to prevent the retraction of the stop 70 and the valve V until the closer is shut, at which time the stop 71 will have been pulled below the curved working face of the stop 70.

The operation of the valve V, as hereinbefore stated, is controlled by the weighing mechanism, and in the present case one of the beams serves as an actuator for opening said valve on the return stroke of said actuator-beam. The two beams, it will be evident from the preceding description, are of different efficiencies, the beam of greater efficiency serving to shift and the interlocking-stop mechanism hereinbefore described acting to hold the beam of less efficiency in its shifted position while the load is being discharged. When the beam having the less efficiency returns to its primary position, it will impart an upward thrust to the rod 38 for swinging the valve V open or from under the outlet of the hopper H to permit the supply to enter the load-receiver.

In Fig. 2 the valve V is represented as open, at which time the full volume of the supply from the hopper H enters the empty receiver G. On the completion of the load the latch L' is tripped, in the manner hereinbefore described, to release the closer, and as the closer opens the rod 73 is elevated, and the stop 71, connected to said rod, is thrust upward and behind the valve-stop 70, as indicated in Fig. 5. As soon as the load commences to discharge the heavier beam-weight W instantly returns to its primary position against the stops 80 upon the framework; but the beam-weight is held against return with the other beam by the two interlocking stops 70 and 71 and the rod 38, bearing against the projection 39 on the tripper-arm 40, connected with the arm 7 of the beam B', and, by reason of the connections described, as the beam B returns to its primary position it serves to shift its companion beam for a slight and further downward distance. When the stop 71 releases its companion or valve-operative stop 70, the beam B' will be simultaneously released, and the weight W' thereof can drop toward the stops 81 on the base 2. The poising side of the beam B' will be elevated, and an upward thrust will be imparted by the rod 38, through the link 42 and tripper-arm 40, for swinging the valve V open. At the same time the tripper is shifted about its center and returned to the position shown in Fig. 2, where it may be engaged by the detent D.

The operation of the hereinbefore-described machine, briefly set forth, is as follows: In Fig. 2 the parts are shown occupying their primary positions, at which time the closer L is shut and held in such position by the latch L', which is in engagement with the arm 24, and the valve V is wide open to permit the full volume of the supply to enter the empty load-receiver G. When a certain proportion of the load has been received, the load-receiver, and consequently the poising portions of the two beams B and B', will descend so as to draw the link 42 and tripper T downward, thereby pulling the projection 39 away from the rod 38, so that the valve V can close under the outlet of the hopper H to cut off the supply, this operation being concluded on the completion of the load, at which time the actuator 50 on the rod 38 will have struck the detent-arm 52 to lift said detent-arm above the upper edge of the tripper-arm 43, thereby to release the tripper T, so that on the slight and further descent of the poising portion of the beam B' the projection 39 on the tripper-arm 43 can be carried against the curved face 56 on the latch L' to lift the weighted arm 23 of said latch above the latch-arm 24 and release the closer L, which is then forced open by the weight of the load. On the discharge of the load the beam B' is locked against return movement in the manner hereinbefore specified. When the closer L shuts, the beam B' returns to its primary position and in so doing imparts an upward thrust to the rod 38 for opening the valve V, as hereinbefore set forth, whereby the operation can be repeated.

Having described my invention, I claim—

1. The combination, with a load-receiver, of stream-supplying means; a stream-controller; a plurality of simultaneously-descendable load-receiver-supporting beams mounted on the framework, one of said beams constituting an actuator for the stream-controller; and means operable to prevent the return or ascent of the stream-controller-actuating beam while permitting the movement of the other beam for a predetermined period.

2. The combination, with a load-receiver, of stream-supplying means; a stream-controller; a plurality of simultaneously-descendable oscillatory load-receiver-supporting beams mounted on the framework, one of said beams constituting an actuator for the stream-controller; and means operable to prevent the return or ascent of the stream-controller-actuating beam while permitting the movement of the other beam for a predetermined period.

3. The combination, with a load-receiver, of stream-supplying means; a stream-controller; a plurality of simultaneously-descendable load-receiver-supporting beams mounted upon the framework and of different efficiency, the beam of less efficiency constituting an actuator for the stream-controller; and means operable to prevent the return or ascent of the stream-controller-actuating beam with the other beam for a predetermined period.

4. The combination, with a load-receiver, of stream-supplying means; a stream-controller; a plurality of simultaneously-descendable load-receiver-supporting beams mounted on the framework, the counterbalances of which are of different efficiencies, the beam having the counterweight of less efficiency constituting an actuator for the stream-controller; and means operable to prevent the return or ascent of the stream-controller-actuating beam with the other beam for a predetermined period.

5. The combination, with a load-receiver, of stream-supplying means; a stream-controller; a plurality of simultaneously-descendable load-receiver-supporting beams mounted on the framework, one of said beams having a chambered counterweight and constituting an actuator for the stream-controller; and means operable to prevent the return or the ascent of the stream-controller-actuating beam with the other beam for a predetermined period.

6. The combination, with a load-receiver, of stream-supplying means; a stream-controller; a plurality of simultaneously-descendable load-receiver-supporting beams mounted on the framework, one of the beams having a solid counterweight and the other having a chambered counterweight and constituting an actuator for the stream-controller; and means operable to prevent the return or ascent of the stream-controller-actuating beam with the other beam for a predetermined length of time.

7. The combination, with a load-receiver, of stream-supplying means; a stream-controller; a plurality of simultaneously-descendable load-receiver-supporting beams connected with each other and mounted on the framework, one of said beams constituting an actuator for the stream-controller; and means operable to prevent the return or ascent of the stream-controller-actuating beam while permitting the movement of the other beam for a predetermined period.

8. The combination, with a load-receiver, of load-discharging means; stream-supplying means; a stream-controller; a plurality of simultaneously-descendable load-receiver-supporting beams mounted on the framework, one of said beams constituting an actuator for the stream-controller; and means operable with the load-discharging means to prevent the return or ascent of the stream-controller-actuating beam while permitting the movement of the other beam for a predetermined period.

9. The combination, with a load-receiver having a closer, of stream-supplying means; a stream-controller; a plurality of simultaneously-descendable load-receiver-supporting beams mounted on the framework, one of said beams constituting an actuator for the stream-controller; and means operable with the closer to prevent the return or ascent of the stream-controller-actuating beam while permitting the movement of the other beam for a predetermined period.

10. The combination, with a load-receiver having a closer, of stream-supplying means; a stream-controller; a plurality of simultaneously-descendable load-receiver-supporting beams of different efficiencies mounted on the framework, one of said beams constituting an actuator for the stream-controller; reciprocally-effective stops operative, respectively, with the closer and the valve; and a connection between the valve and the beam of less efficiency.

11. The combination, with a load-receiver, of a supply-valve; a valve supported for oscillatory movement beneath the outlet of the hopper; a plurality of simultaneously-descendable load-receiver-supporting beams of different efficiencies mounted on the framework, one of said beams constituting an actuator for the valve; and a connection between said valve and the beam of less efficiency.

12. The combination, with a load-receiver, of stream-supplying means; a stream-controller; a plurality of simultaneously-descendable beams supporting the load-receiver and mounted to have different ratios of movement, the beam having the greater ratio constituting an actuator for the stream-controller; and means operable to prevent the return or ascent of the actuator-beam with the other beam for a predetermined period.

13. The combination, with a load-receiver having a closer, of stream-supplying means; a stream-controller; a plurality of simultaneously-descendable connected load-receiver-supporting beams of different efficiencies mounted on the framework, one of said beams constituting an actuator for the stream-controller; a stop connected with the stream-controller; a coöperative stop mounted upon the load-receiver and connected with the closer, each of said stops being in position to block the action of the other; and a rod connected with the stream-controller and in position to be acted upon by the beam of less efficiency.

14. The combination, with a load-receiver having a closer, of stream-supplying means; a stream-controller; a plurality of simultaneously-descendable connected load-receiver-supporting beams of different efficiencies mounted on the framework, one of said beams constituting an actuator for the stream-controller; a stop connected with the stream-controller; a coöperative stop mounted upon the load-receiver and connected with the closer, each of said stops being in position to block the action of the other; a rod connected with the stream-controller and in position to be acted upon by the beam of less efficiency; and means for shifting said rod relatively to the actuator-beam.

15. The combination, with weighing mechanism including a load-receiver, and a pair of beams connected for movement one relatively to the other, of load-discharging means involving a latch; a latch-tripper mounted upon one member of the weighing mechanism and connected with another member of the weighing mechanism for operation; a detent normally operative for holding the latch-tripper against action; and means for actuating said detent at a predetermined period from the movement of one beam relatively to the other beam.

16. The combination, with a load-receiver, of load-discharging means including a latch; a plurality of beams for supporting the load-receiver; and a latch-tripper mounted upon one beam and connected with the other beam.

17. The combination, with a load-receiver, of load-discharging means involving a latch; a plurality of beams for supporting the load-receiver; a latch-tripper mounted upon one of the beams; and a link connected with the other beam and with said latch-tripper.

18. The combination, with weighing mechanism including a load-receiver, of load-discharging means including a latch; a latch-tripper mounted upon one member of the weighing mechanism and connected with another member for operation; a detent normally effective for holding the latch-tripper against action; a supply apparatus; and means operative with the supply apparatus for actuating said detent at a predetermined period of time to release the latch-tripper.

19. The combination, with weighing mechanism including a load-receiver, of load-discharging means involving a latch; a latch-tripper mounted upon one member of the weighing mechanism and connected with another member of the weighing mechanism for operation; a detent normally effective for holding the latch-tripper against action; stream-supplying means; a stream-controller; and means governed by the stream-controller for actuating said detent at a predetermined time to release the latch-tripper.

20. The combination, with weighing mechanism including a load-receiver, of load-discharging means including a latch; a latch-tripper mounted upon one member of the weighing mechanism and connected with another member of the weighing mechanism for operation; a detent normally operative for holding the latch-tripper against action; a supply-valve; and a rod coöperative with said supply-valve and provided with means for actuating said detent at a predetermined time to release the latch-tripper.

21. The combination, with a load-receiver, of load-discharging means involving a latch; a plurality of beams for supporting the load-receiver; a latch-tripper mounted upon one beam and connected with another beam for operation; a detent upon the framework, having an arm provided with a weighted offset located to engage the latch-tripper; and means for engaging the other arm of the detent to release the latch-tripper.

22. The combination, with a load-receiver, of a plurality of supporting-beams therefor, of load-discharging means involving a latch; a latch-tripping lever mounted upon one of the beams; a link connected with the other beam and with one of the arms of the latch-tripping lever; a detent located to engage the other arm of the latch-tripping lever; and means for actuating the detent to release the latch-tripping lever.

23. The combination, with a load-receiver, of a plurality of beams for supporting the same; load-discharging means involving a latch having a curved face; and a latch-tripper mounted upon one of the beams and connected with the other beam and provided with a device for engaging the curved face of the latch.

24. The combination, with a load-receiver, of a plurality of supporting-beams therefor; stream-supplying means; a supply-valve; load-discharging means involving a latch; a latch-tripper mounted upon one beam and connected with another beam for operation; a detent one arm of which is weighted and engages the latch-tripper; and a rod connected with the supply-valve and operative with said beam and provided with a device for engaging the free arm of the detent to effect the release of the latch-tripper.

25. The combination, with weighing mechanism including a load-receiver, of load-discharging means involving a latch; a latch-tripper mounted upon one member of the weighing mechanism and connected with another member of the weighing mechanism for operation; a detent mounted upon the framework and having a weighted offset provided with an angular face, said offset being located to engage the latch-tripper; and means operative to engage the free arm of the detent, to effect the release of the latch-tripper.

26. The combination, with weighing mechanism including a load-receiver, of a closer covering the outlet of the load-receiver; a regulator mounted upon the load-receiver and having a pocket situated beneath the discharge edge of the closer; connections between the regulator and the closer; a closer-shutting weight connected with the regulator; an arm operative with the latter; and a latch for engaging said arm.

27. The combination, with weighing mechanism including a load-receiver, of a closer for covering the discharge-outlet of the load-receiver; a closer-retarding regulator mounted upon the load-receiver and having a pocket situated below the discharge edge of the closer; a crank-arm secured to the regulator and connected by a link with the closer; a closer-shutting weight; and an arm connected with the regulator and the latch for engaging said arm.

28. The combination, with a load-receiver, of stream-supplying means; a plurality of simultaneously-descendable load-receiver-supporting beams mounted on the framework, one of which constitutes an actuator; a member in position to be operated by the actuator-beam; and means operable for preventing the return or ascent of the actuator-beam, said means permitting the return of the other beam.

FRANCIS H. RICHARDS.

Witnesses:
F. N. CHASE,
JOHN O. SEIFERT.